July 28, 1959     S. Z. SIWEK     2,896,731
SELF-PROPELLED MOWER

Filed Jan. 14, 1959     3 Sheets-Sheet 1

INVENTOR.
STANLEY Z. SIWEK
BY *Lindberg & Bradway*
ATTORNEYS

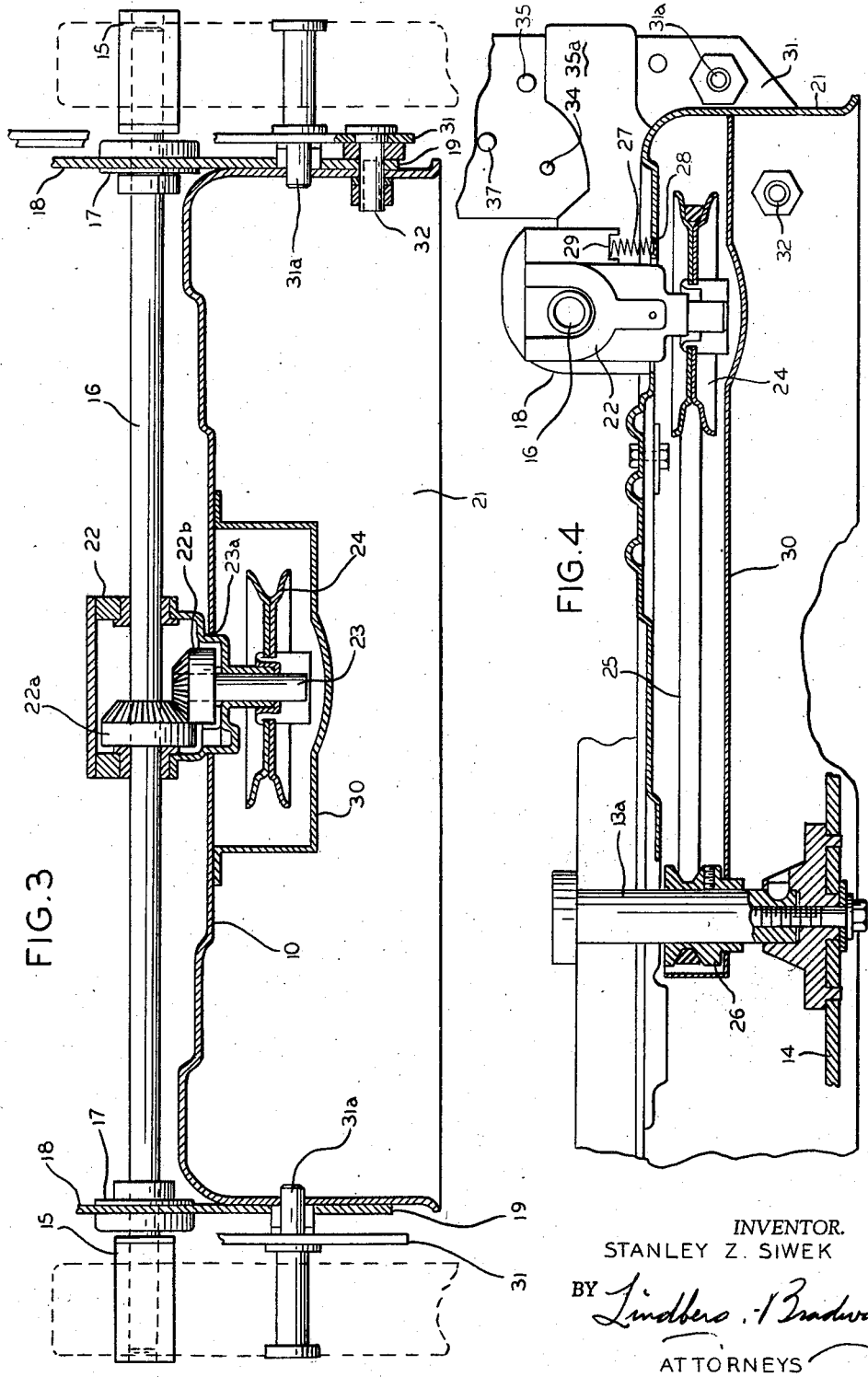

*INVENTOR.*
STANLEY Z. SIWEK
BY *Lindberg & Bradway*
ATTORNEYS

United States Patent Office 2,896,731
Patented July 28, 1959

2,896,731

SELF-PROPELLED MOWER

Stanley Z. Siwek, Chicago, Ill., assignor to Pioneer Gen-E-Motor Corp., Chicago, Ill., a corporation of Illinois Application January 14, 1959, Serial No. 786,719

13 Claims. (Cl. 180—19)

This invention is directed to power tools and particularly relates to power mowers of the type using a wheel supported base and a cutter bar rotated on a vertical axis.

Tools of this class are oftentimes propelled over the supporting surface by hand. If they are provided with a propulsion system driven from a motor on the wheel supported base, it is highly desirable to provide a simple, convenient and inexpensive system for disconnecting the drive from time to time, so as to enable free wheeling of the base, without requiring stopping of the motor in order to stop the tool.

Accordingly, a primary object of the invention is to provide a practical and inexpensive wheel drive system for a tool of the foregoing class and which enables the operator to easily control the drive through simple manipulation of the guiding handle normally associated with such tools.

Another purpose is to provide a simple rear wheel mounting and driving means therefor in a mower of the type described.

Another purpose is to provide a simple and efficient overload release system for the wheel drive system of such tools and which not only breaks the drive upon overload, but also maintains proper tension on a pulley and belt used in the drive while allowing easy assembly of the drive.

Another purpose of the invention is a simple system for "locking out" the wheel drive to enable free wheeling as desired while also preventing undue wear on the driving elements during periods of non-use.

Another purpose of the invention is the provision of a drive controlling system for such tools by using the guiding handle therefor in such a manner that the natural reactions of the user are employed for disconnecting the drive for free wheeling in turning a corner and for increasing driving traction and power when such is needed.

Other objects and purposes will become apparent from the specification and claims which follow when taken with the accompanying drawings, in which:

Figure 3 is a rear view of the mower of Figure 1, certain parts being broken away and other parts being shown in section for purposes of clarity;

Figure 4 is a longitudinal section view;

Figure 1:
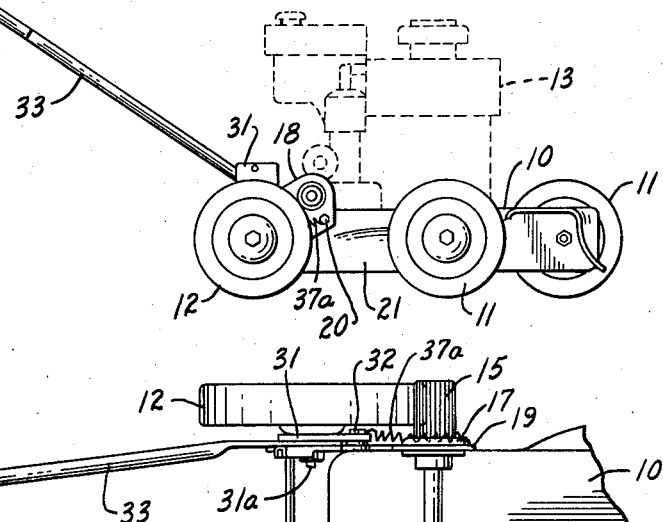
Figure 1 is a side view of the mower embodying the present invention.

Referring particularly now to the drawings wherein like elements are designated by like characters throughout and in the first instance to Figure 1, 10 illustrates a mower base supported by front wheels 11 and rear wheels 12. A motor 13 is mounted on the upper surface of the base or platform and has a vertical output shaft 13a connected to a rotary cutting blade 14 beneath the platform. It should be understood that the showing of the platform or base 10, motor 13 and cutting blade 14 are representative of the type of tool in which the present invention is applicable.

In order to impart driving power to the rear wheels 12, a pair of generally cylindrical frictional driving elements 15 are carried by a driven shaft 16 and positioned on opposite sides of the base 10 for a driving frictional engagement with the rear wheels 12. Shaft 16 is rotatably supported in self-aligning bearings 17 which are supported in upstanding projecting portions 18 of bearing plates 19. The bearing plates 19 are fixed to and integral with the base, as by means of suitable bolts or the like 20 and 32 which hold the sides of the plates against the depending skirt 21 of the base.

Figures 8, 9:
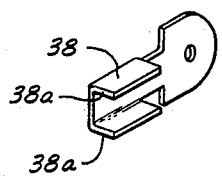
Figure 8 is a perspective view of a latching element.
Figure 9 is a sectional view of a bearing element.

The bearings 17, as will be seen best in Figure 9, each include an outer race 17a which is fixed to its bearing plate 19. The outer race 17a may have a flange 17b which bears against the inner side of the bearing plate. An inner race 17c is fixed to the shaft 16 as by means of the set screw 17d. A set of balls 17e are spaced circumferentially of the inner race and outer race. The balls 17e ride in a groove 17f, the curvature of which closely conforms to the curvature of the balls 17e and which extends around the shaft facing surface of the outer race. The balls also ride in a groove 17g which extends around the peripheral wall of the inner race. The groove 17g has a width (taken parallel to the axis of shaft 16) which is greater than the width of the groove 17f. The groove 17g may be formed on a radius greater than the radius of groove 17f.

By forming the bearings in this manner, the base 10 which may be made from a metal stamping, may twist or undergo some distortion without binding the drive shaft 16 in the bearings. The spaced surfaces of the inner and outer race along with the larger groove in one race permit such twisting while maintaining the balls in rolling contact with the grooves, and the driving elements in engagement with the wheels.

The inner race may be comprised of two sections 17c and 17h to thereby facilitate assembly, the two sections together defining the walls of groove 17g.

The opposed surfaces of the races and the greater width of one groove may be such as to permit an inclination between the axes of the races of approximately five degrees or so and correspondingly accommodate the distortion of the base from the condition desired and attendant misalignment of the bearing plates 19 which produces such inclination.

The driving elements 15 may have grooves cut in the surface thereof so as to enhance the frictional engagement with the wheels.

The drive system includes a simplified means for driving the shaft 16 from the motor 13 while automatically discontinuing the drive upon the occurrence of an overload in the system. A gear housing 22 is swingably mounted on the shaft 16 above the base 10 and supports a depending pulley shaft 23 which extends perpendicularly to shaft 16 and is rotatably supported in the housing 22. Bevel gears 22a and 22b are fixed to the shafts 16 and 23, respectively, and positioned in the housing 22 for engagement with one another. The shaft 23 extends through an aperture 23a in the base and carries a pulley 24, which is fixed to the lower end of the shaft. Aperture 23a is enlarged, as seen in Figure 4, so as to allow forward and rearward swinging movement of the shaft 23 and housing 22 therein. Sliding movement of the housing on shaft 16 is prevented by the engagement of the lower portion of the housing with the longitudinally extending side walls of aperture 23a. A belt 25 is passed around pulley 24 and a pulley 26 on the shaft 13a so as to complete the driving connection between the motor 13 and rear wheels 12. As the pulley 24 swings forwardly about the axis of the shaft 16, the tension on the belt is decreased while as the pulley swings rearwardly, the tension on the belt is increased.

The system includes a yieldable means for taking up slack and maintaining the proper tension on the belt 25 for adequate driving power while at the same time providing the overload release aforementioned. The yieldable means is in the form of a coiled compression spring 27 which is seated in a recess 28 in the upper surface of the base and in a recess 29 in the under surface of the rear portion of the housing 22 so as to bias the rear portion of the housing upwardly with relation to the base and thereby bias the pulley 24 rearwardly or in a belt tightening direction.

A belt and pulley guard plate 30 is positioned underneath the belt 25 and pulley 24 so as to shield the drive against clippings, stones or the like which may be thrown upwardly by the cutting blade 14 during rotation thereof.

Figure 5:
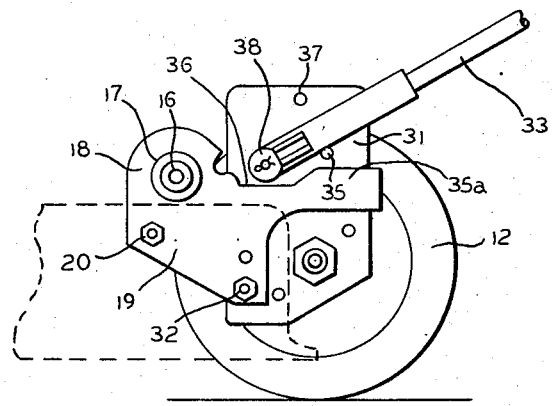
Figure 5 is a side view of the wheel mounting and controlling elements in a normal operating position.

Operator control of the propulsion system is attained by a wheel mounting and linkage system for the rear wheels. The rear wheels 12 are journalled for rotation in mounting plates 31 which are positioned outboard of the bearing plates 19 and spaced a small distance therefrom, as is seen best in Figure 3. Axles 31a are fixed to the mounting plates and rotatably support the wheels 12 thereon. The mounting plates 31 are rotatably mounted on studs 32 carried by the bearing plates 19 and passed through the skirt 21. The wheel axes are so positioned with relation to the axes of the mounting plates pivot studs that the weight of the base and motor assembly forces the pivot studs downwardly, thus swinging the wheel axes forwardly until driving contact with the driving elements 15 is attained as seen in Figure 5.

An operator actuated controlling and guiding handle 33 is swingably mounted on pivot pins 34 which project inwardly from the wheel mounting plates 31. Each side of handle 33 is adapted to rest upon an abutment 35, which takes the form of a rod fixed to the mounting plates and extending transversely thereto. Handle 33 extends upwardly and rearwardly from the base in the normal operating position of Figure 5. The rod is limited in downward movement by stop portions 35a of the bearing plates 19, such portions projecting upwardly from the base at positions located rearwardly of the normal position of the handle pivots.

Figure 6:
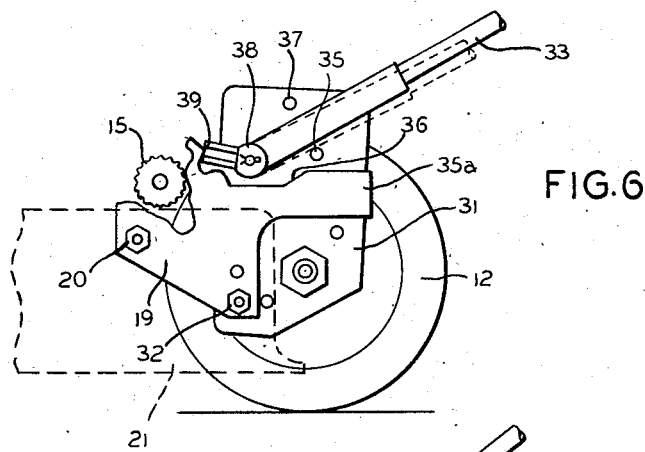
Figure 6 is a side view of certain elements of Figure 5 but illustrating another operative position of those elements.

The bearing plates may include depressions 36 in the upper portions thereof so as to enhance a compact relation of the handle pivots, wheel mounting plates and bearing plates. When the outer end of the handle is depressed, a downward force is exerted on rod 35 and the side portions of the handle in effect become unitary with the mounting plates so as to pull the mounting plates and rear wheels 12 away from the driving elements 15 as seen in Figure 6, thus stopping propulsion. The handle has a weight such that when it rests upon abutment 35, it imparts a force sufficient to break the driving engagement between the rear wheels 12 and driving elements 15.

Figure 2:
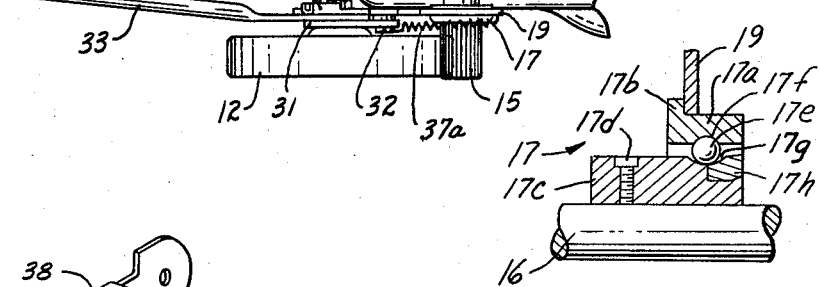
Figure 2 is a top view of the mower shown in Figure 1.
Figure 7:
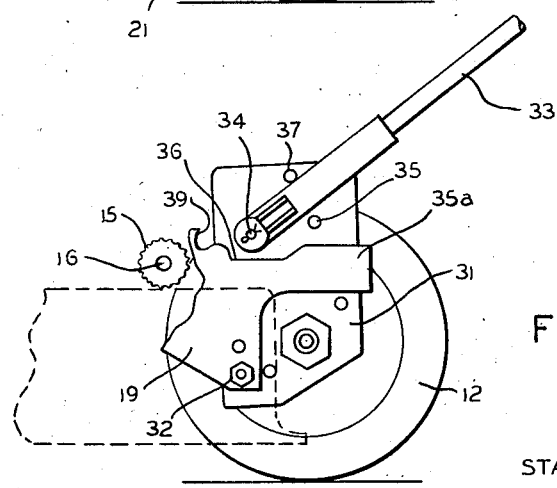
Figure 7 is a side view of the elements shown in Figure 6 but illustrating another operative position of the elements.

In some situations greater driving power than normal may be desired. To accomplish this, additional abutments 37 in the form of pins are carried by the wheel mounting plates at locations above the handle side portions. By swinging the handle upwardly, the handle side portions are caused to engage the pins 37 and the wheel mounting plates are thereby moved forwardly a further distance to force the wheels more firmly against the driving elements as seen in Figure 7. The showing of the abutments 37 has been omitted in Figure 2 in view of the small scale used in Figure 2, the omission being in the interests of clarity. Tension springs 37a are connected between the wheel mounting plates 31 and a forward portion of the bearing plates 19 so as to bias the wheels 12 into engagement with the driving elements 15. The springs 37a, while aiding the movement of the wheels toward the driving elements 15, are not of such a strength as to overcome the weight of the handle when the handle rests upon the abutment rod. In this position of the handle, the wheels are out of engagement with the driving elements 15.

Latching elements are carried by the handle pivots for selective engagement with cooperating latching elements on the bearing plates 19. The elements carried by the pivots 34 are in the form of elongated plates 38 having the outer ends thereof bent to form spaced and parallel portions. The outer spaced edges of these portions are adapted to embrace rearwardly facing and tapered projecting portions 39 on the plates 19. When it is desired to lock out the propulsion system for free wheeling of the mower, the latching elements 38 may be swung downwardly from the inoperative position, while the handle is depressed as in Figure 6, and aligned with the portions 39. When the handle is released, the spaced edges 38a of the latching elements engage the tapered portions 39 and hold the wheels and driving elements in spaced, unclutched relation as seen in Figure 6. The notch or recess at the lower side of the projection 39 provides a shoulder against which the lowermost edge 38a of the latching element 38 abuts when the latching element 38 is in the operative or latched position of Figure 6. When thus latched, the handle 33 may rest upon the rod 35 as indicated in dotted outline in Figure 6 or may be swung upwardly therefrom, as indicated in full line, for convenience in storage or to accommodate the operator's desires as to handle position during free wheeling of the mower.

Whereas I have shown and described an operative form of the invention, I wish it to be understood that this showing and description thereof are to be taken in an illustrative or diagrammatic sense, and since modifications which fall within the scope and spirit of the invention will be apparent to those skilled in the art, the invention shall be limited only by the scope of the hereinafter appended claims.

The use and operation of the invention is as follows:

I illustrate an operator controlled mower which uses the operator's more or less natural reactions for controlling the drive system. If the operator, for example, desires more power as when moving up an incline or when encountering heavy growths of weeds or the like, the operator's natural instinct for a helpful push will raise the handle upwardly to engage the lugs 37 for a more firm engagement between the driving elements and rear wheels as in Figure 7. If the operator desires to stop the mower, he simply uses his natural reaction of pulling rearwardly on the handle to depress same as the mower moves forwardly until the handle side portions engage the abutment 35 and causes a disengagement of the driving elements from the rear wheels.

An operator can unclutch the system for free wheeling or for operator imparted movement of the mower by simply pressing downwardly on the handle, or by dropping the handle 33, the weight of which is ordinarily sufficient to unclutch the rear wheels. The downward movement of the handle is highly advantageous in negotiating a turn since such downward movement both unclutches the system for free wheeling and tends to raise the front wheels slightly so that the mower is easily turned on the rear wheels. This is highly advantageous in using the mower for relatively short paths of reverse travel of the mower, since the operator, by pulling rearwardly and downwardly, or by simply dropping the handle 33, can disconnect the drive for a free wheeling reverse movement while using the drive for forward movement.

The handle movement is also advantageous from a safety standpoint since if the operator should stumble or fall while guiding the mower, and while holding the handle, the handle may be depressed for unclutching of the mower.

The latching elements 38 are so formed and mounted as to require a downward unclutching movement of the handle before the spaced edges 38a are removed from the cooperating latching elements 39. This insures that the operator will have the drive system disconnected before moving the latches to the inoperative position. It should be noted that the latches may be used both for operator propelling of the mower and during storage of the mower to avoid excessive wear on the tires of the wheels.

The drive system is protected against overloading thereof by the swingable mounting of the drive shaft 23, the shaft 23 and driven pulley 24 moving toward the driving pulley 26 to disconnect the belt drive when an overload occurs. Spring 27 not only maintains the proper tension on the belt 25 but automatically takes up slack as the belt wears and stretches during use.

The particular overload and belt tensioning assembly is easily assembled by mounting the shaft 16 on the mower base and simply snapping the spring into position.

The particular wheel mounting system and drive system afford convenience of both manufacture and use since the bearing plates and wheel mounting plates are easily attached to the bases of new mowers as well as to the skirts of existing free wheeling constructions so as to enable self-propulsion of the same.

It should be understood that, if desired, a fixed or adjustable stop in the form of a set screw or the like may be substituted for the spring 27 in order to hold the gear housing and pulley in the proper belt tightened position although such a fixed stop will not provide the overload release function aforementioned.

I claim:

1. In a self-propelled system for a wheel supported tool of the rotary mower type having a platform with a power means thereon for operating said tool and means for supporting the forward end of said platform, the improvement including a rear wheel mounting plate pivoted at each side of and at the rear of said platform, a rear supporting wheel mounted for rotation on each said plate about an axis eccentric to the axis of the mounting plate pivot, a bearing plate fixed to the rear of said platform at each side thereof, a rotary power shaft journaled for rotation in upstanding portions of said bearing plates and positioned with the axis thereof in a substantially fixed position above said base and forwardly of said rear wheels, means driving said shaft from said power means, friction driving elements carried by said power shaft and positioned for engagement with said rear supporting wheels upon downward movement of said base relative to said wheels, a guiding handle having side portions pivoted to said mounting plates and extending upwardly and rearwardly therefrom, an abutment rod carried by and extending between said mounting plates and engageable with said handle upon a predetermined downward movement of said handle, said handle pivots being located on said mounting plates at positions such that downward movement of said handle and a forced engagement with said abutment rod moves said wheel mounting plates away from said friction drive elements, said bearing plates having other portions upstanding from said base and positioned for engagement with said rod upon a predetermined downward movement thereof so as to limit the downward movement of said rod and movement of said rear wheels away from said driving elements.

2. In a self-propelled system for a wheel supported tool of the rotary mower type having a platform with a power means thereon for operating said tool and means for supporting the forward end of said platform, the improvement including rear wheel mounting members pivoted at each side of and at the rear of said platform, a rear supporting wheel mounted for rotation on each said member about an axis eccentric to the axis of the mounting member pivot, a bearing plate fixed to the rear of said platform at each side thereof, a rotary power shaft journaled for rotation in upstanding portions of said bearing plates and positioned with the axis thereof in a substantially fixed position above said base, means driving said shaft from said power means, a friction driving elements carried by said power shaft and positioned for engagement with said rear supporting wheels upon downward movement of said base relative to said wheels, a guiding handle having side portions pivoted to said mounting members and extending upwardly and rearwardly therefrom, abutment means carried by said mounting members and engageable with said handle upon a predetermined downward movement of said handle, said handle pivots being located on said mounting members at positions such that downward movement of said handle and a forced engagement with said abutment means moves said wheel mounting members and said rear wheels away from said friction drive elements, said bearing plates having further portions upstanding from said base and positioned for engagement with said abutment means upon a predetermined downward movement thereof so as to limit the downward movement of said abutment means and said wheel mounting members and limit movement of said rear wheels away from said driving elements.

3. The structure of claim 2 characterized by and including tension springs connected between said mounting members and said platform so as to bias said wheels toward said driving elements.

4. The structure of claim 2 wherein said handle is pivoted to said mounting members and movable between spaced upper and lower abutments on said mounting members, engagement of said handle with the lower abutments causing a forced lifting of said platform relative to said wheel axes and engagement of said handle with said upper abutments causing a forced engagement of said wheels with said driving elements.

5. The structure of claim 2 wherein said handle is pivoted on said mounting members and carries pivoted latching elements adapted to be moved into engagement with cooperating latching elements on said bearing plates for holding said wheels out of engagement with said driving elements.

6. The structure of claim 5 wherein the latching elements on said bearing plates are in the form of rearwardly extending projections and the latching elements on the handle are in the form of plates, each plate having spaced surfaces adapted for embracing engagement with one of the projections.

7. The structure of claim 2 wherein said driving means includes a pulley shaft suspend from said power transmitting shaft and gear means between said shafts, and a drive belt leading from said power means to a pulley on said pulley shaft.

8. A driving attachment for rotary mower bases having front and rear supporting wheels and a motor thereon for rotating a cutting blade including a pair of spaced bearing plates adapted for attachment at the sides of a mower base and a power transmitting shaft rotatably mounted in said plates, frictional driving elements carried by said shaft, one driving element being spaced outboard of each said bearing plate, means for mounting rear supporting wheels for a mower on said bearing plates, said mounting means including a wheel mounting plate spaced outboard of each said bearing plate, said mounting plates being pivoted on said bearing plates rearwardly of said driving elements for movement of the wheels toward and away from said driving elements and for engagement with said elements, each of said mounting plates having an abutment projecting inwardly toward said bearing plates, and a handle pivoted to said mounting plates and extending rearwardly therefrom, said handle being adapted for engagement with said abutments upon downward movement thereof to cause movement of said mounting plates away from said driving elements.

9. The structure of claim 8 wherein a latch is mounted on each mounting plate and cooperable with a latching element on a bearing plate adjacent thereto, each said latch and latching element being effective, when engaged, to hold said wheels away from said driving elements.

10. The structure of claim 8 wherein each bearing plate has a surface positioned for contact with one of said abutments upon a predetermined downward movement of said abutments, and a concave depression in the upper edge thereof between said surface and the portion of said bearing plate carrying said shaft, said depression being positioned below the level of said handle pivot so as to allow said handle and pivot portion thereof to overlie its associated bearing plate while positioned closely adjacent thereto.

11. The structure of claim 10 characterized by and including latching elements pivoted on each said mounting plate and adapted to engage a latching projection on said bearing plate.

12. In a self propelled system for a wheel supported tool of the rotary mower type which has a platform having a power means thereon for operating said tool, means for supporting the forward end of said platform and rear wheel mounting members at each side of and at the rear of said platform for supporting rear wheels for movement toward and away from rotary frictional driving elements carried by said platform, the improvement comprising upstanding bearing plates at each side of said platform for supporting a power shaft which carries said driving elements, handle means interconnected with said mounting members to control movement of said mounting members to move said wheels toward and away from said driving elements, a latching member carried by each mounting member, each bearing plate having a latching element defined by a shoulder thereon and opposed to the latching member at that side of the platform, each latching member being cooperable with the latching element on its side of the platform for holding the wheels carried by said mounting members away from said driving elements when said handle has moved said wheels away from said driving elements, said latching members extending between said mounting members and said bearing plates and engaging said shoulders in the cooperable position of said latch members and latching elements.

13. The structure of claim 12 wherein each bearing plate has an upwardly concave surface located below said latching element and each latching member is positioned closely adjacent said concave surface while being positioned above said surface.

References Cited in the file of this patent
UNITED STATES PATENTS

| | | |
|---|---|---|
| 1,458,963 | Aultman | June 19, 1923 |
| 1,537,235 | Hay | May 12, 1925 |
| 2,474,085 | Albright | June 21, 1949 |
| 2,549,317 | Laughlin | Apr. 17, 1951 |
| 2,564,201 | Hainke | Aug. 14, 1951 |
| 2,604,747 | Bash | July 29, 1952 |
| 2,623,603 | Cutlan et al. | Dec. 30, 1952 |
| 2,630,185 | Adams | Mar. 3, 1953 |
| 2,657,408 | Machovec | Nov. 3, 1953 |
| 2,689,620 | Hainke | Sept. 21, 1954 |
| 2,714,934 | Cassady | Aug. 9, 1955 |
| 2,736,389 | Phelps | Feb. 28, 1956 |
| 2,824,415 | Frazier | Feb. 25, 1958 |